United States Patent [19]

Iwata et al.

[11] Patent Number: 5,507,152
[45] Date of Patent: Apr. 16, 1996

[54] POWER SEPARATING APPARATUS IN AUTOMOBILE

[75] Inventors: Shoichi Iwata; Shigeki Kato; Kazumasa Nakanishi; Masami Kitada, all of Nagoya, Japan

[73] Assignee: Kabushiki Kaisha Yunikara, Nagoya, Japan

[21] Appl. No.: 910,339

[22] PCT Filed: Jun. 12, 1992

[86] PCT No.: PCT/JP92/00755

§ 371 Date: Jul. 21, 1992

§ 102(e) Date: Jul. 21, 1992

[87] PCT Pub. No.: WO93/25825

PCT Pub. Date: Dec. 23, 1993

[30] Foreign Application Priority Data

Dec. 17, 1990 [JP] Japan ................... 2-411021

[51] Int. Cl.⁶ ........................................... B60H 3/04
[52] U.S. Cl. ........................ 62/131; 62/133; 62/323.4
[58] Field of Search ................... 62/133, 131, 125, 62/126, 127, 129, 323.4

[56] References Cited

U.S. PATENT DOCUMENTS 4,697,091  9/1987  Tamura .

FOREIGN PATENT DOCUMENTS

| 0045933 | 2/1982 | European Pat. Off. ............... 62/133 |
| 0066874 | 12/1982 | European Pat. Off. . |
| 0090209 | 10/1983 | European Pat. Off. . |
| 57-200691 | 12/1982 | Japan . |
| 61-46350 | 4/1983 | Japan . |
| 1-28345 | 6/1983 | Japan . |
| 59-126715 | 8/1984 | Japan . |
| 61-275017 | 12/1986 | Japan ................... 62/133 |
| 2055496 | 3/1981 | United Kingdom . |

*Primary Examiner*—Harry B. Tanner

[57] ABSTRACT

A power separating apparatus in an automobile comprises first detecting means for generating a first electric signal having a predetermined voltage level when an engine is actuated, second detecting means for generating a second electric signal having a predetermined voltage level when a rotated device is not actuated, determining means for generating a failure signal indicating a failure of the rotated device depending upon a condition of logical product of the first electric signal and the second electric signal when the rotated device should be actuated, and means for controlling an electromagnetic clutch to separate the rotated device from the driving belt on the basis of the failure signal.

11 Claims, 1 Drawing Sheet

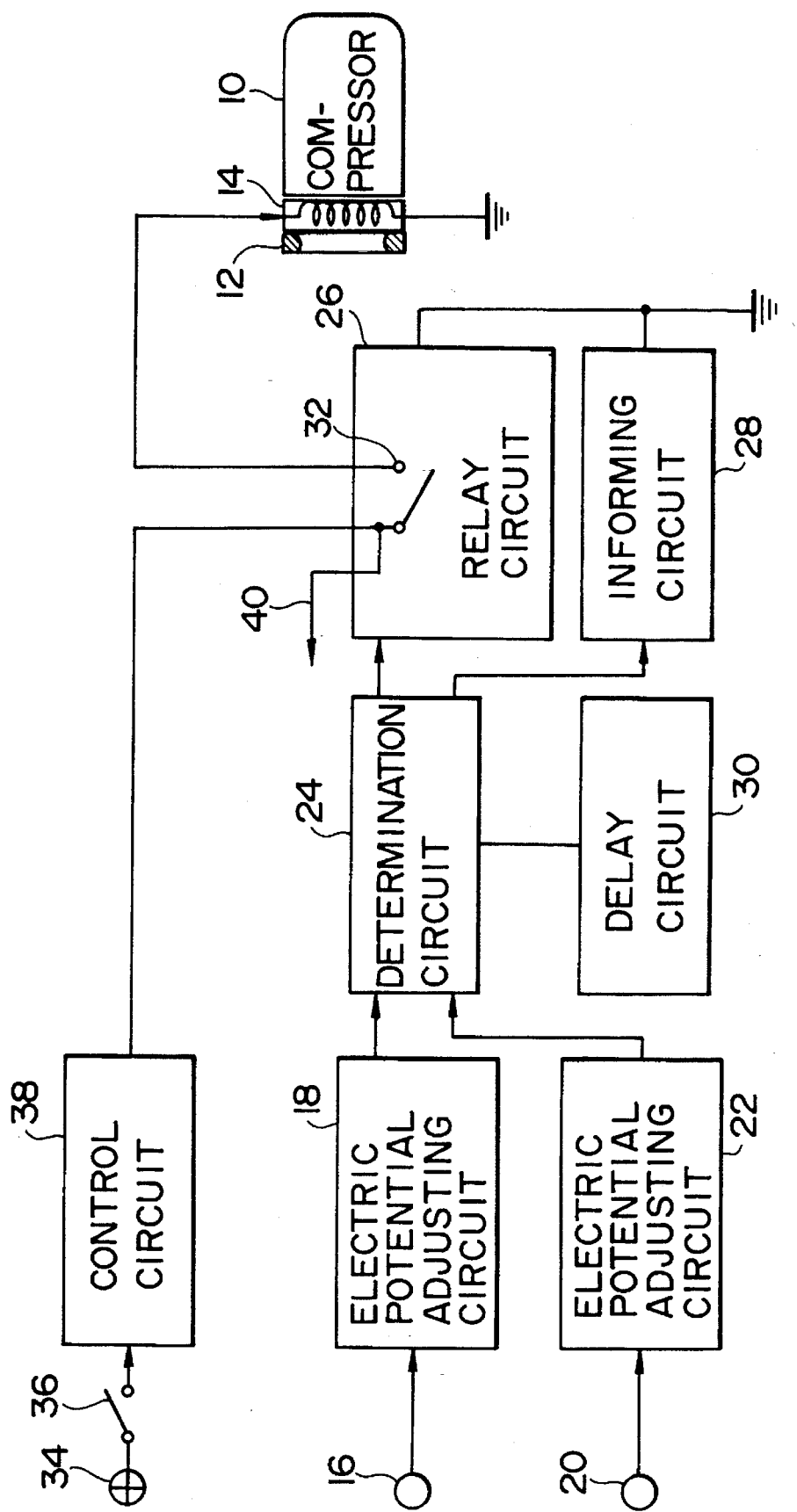

5,507,152

POWER SEPARATING APPARATUS IN AUTOMOBILE

BACKGROUND OF THE INVENTION

1. Field of the Invention

This invention relates to a power separating apparatus in an automobile, and more particularly to an apparatus for separating a rotated device rotated by engine power which is transmitted through a driving belt and an electromagnetic clutch, from the driving belt when the rotated device is failed in rotating.

2. Description of the Prior Art

A rotated device in an automobile such as a compressor for air conditioning system, a hydraulic pump or a generator is rotated by engine power transmitted through power transmission means including a driving belt and an electromagnetic clutch.

In the automobile, however, excessive load is applied to the power transmission means when the rotated device is failed in rotating. This results in destroying the power transmission means. In particular, if a plurality of the rotated devices are connected with a single driving belt, the damaged driving belt causes other rotated devices connected with the driving belt to stop.

To solve the problem set forth above, an apparatus has been proposed to separate a rotated device from a driving belt by removing an electromagnetic clutch mounted corresponding to the rotated device when a ratio of a speed of the engine to that of the rotated device becomes a predetermined value.

In the separating apparatus known per se, it is determined whether or not the rotated device is failed, on the basis of the ratio of the speed of the engine to that of the rotated device. Thus, complicated detecting means is required for detecting each speed of the engine and the rotated device and for processing the detected signal. Further, the ratio of the speed of the engine to that of the rotated device is varied according to kinds of the engine and the rotated device, types of the engine and the rotated device, displacement of the engine or the like. Therefore, a failure remedy apparatus should be prepared for each combination of the engine and each rotated device.

SUMMARY OF THE INVENTION

It is an object of the present invention to provide a power separating apparatus in an automobile, which can serve without complicated detecting means and is not restricted by any combination of an engine and a rotated device.

A power separating apparatus in an automobile according to the present invention comprises first detecting means for generating a first electric signal having a predetermined voltage level when an engine is actuated, second detecting means for generating a second electric signal having a predetermined voltage level when a rotated device is not actuated, determining means for generating a failure signal indicating a failure of the rotated device depending upon a condition of logical product of the first electric signal and the second electric signal when the rotated device should be actuated, and means for controlling an electromagnetic clutch to separate the rotated device form a driving belt on the basis of the failure signal.

When the engine and the rotated device are normally rotated, the second electric signal is not outputted from the second detecting means while the first electric signal is outputted from the first detecting means. As a result, no failure signal is outputted from the determining means.

On the other hand, if the rotated device stops though the engine is normally rotated and the rotated device should be actuated, the first and second detecting means output the first and second electric signals, respectively. Accordingly, the failure signal can be outputted from the determining means. As a result, the operation of the electromagnetic clutch is stopped and the rotated device which is stopped, can be separated from the driving belt.

According to the present invention, there can be provided a simple detecting apparatus as compared with the apparatus known per se for detecting the rotating speed, since the first and second detecting means respectively generate the first and second electric signals when the engine and the corresponding rotated device are actuated or not. The apparatus of the present invention generates the failure signal indicating the failure of the rotated device according to the condition of the logical product of the first and second electric signals when the rotated device should be actuated. Therefore, a failure remedy apparatus may be applied to an arbitrary combination of the engine and the rotated device.

The first and second detecting means can be provided with a circuit for adjusting the voltage level of a signal supplied to the determining means, respectively.

The apparatus of the present invention can be provided with control informing means for informing on the failure of the rotated device.

The control means can be provided with a circuit for shutting off an exciting current supplied to the electromagnetic clutch on the basis of the failure signal.

BRIEF DESCRIPTION OF THE DRAWING

The foregoing and other objects and features of the invention will become apparent from the following description of a preferred embodiment of the invention with reference to the accompanying drawing, in which:

FIG. 1 is a block diagram of an electric circuit illustrating an embodiment of a separating apparatus according to the present invention.

DETAILED DESCRIPTION OF THE PREFERRED EMBODIMENT

Referring now to FIG. 1, a compressor 10 for air conditioning system is shown as a rotated device. The compressor 10 is rotated by an engine (not shown) through an endless driving belt 12 and an electromagnetic clutch 14.

In a failure remedy apparatus, a first electric potential adjusting circuit 18 receives an output signal from a first detector 16 for detecting the normal operation of the engine (not shown). Additionally, a second electric potential adjusting circuit 22 receives an output signal from a second detector 20 for detecting the interruption of the compressor 10.

The first detector 16 is a circuit to output a detected signal having different voltage levels depending upon whether the engine is normally operated or stops. As the first detector 16, use is made of a detector which has been already mounted on an automobile, such as a generator and an engine oil pressure switch. In this case, the output voltage of the generator or the terminal voltage of the switch may serve as the output signal of the first detector 16.

The second detector 20 is a circuit to output a detected signal having different voltage levels depending upon whether the compressor 10 stops or is rotated. For example, if the rotated device is the compressor for air conditioning system, as the second detector 20, use is made of a rotation detecting sensor for detecting that an electromagnetic clutch, a rotating shaft, an internal moving body or the like is rotated, and a discharged gas pulse pressure sensor for detecting a pressure of discharged gas.

The first and second electric potential adjusting circuits 18, 22 adjust voltage levels of the output signals of the corresponding detectors, respectively. Therefore, the first and second electric potential adjusting circuits 18 and 22 are respectively provided with means for manually adjusting the voltage level as in the case of a variable resistor. The output signals of the first and second electric potential adjusting circuits 18 and 22 are supplied to a determination circuit 24.

Among the signals supplied from the first and second electric potential adjusting circuit 18 and 22, the determination circuit 24 defines a signal having such a voltage level that the engine is normally actuated, as a first electric signal. Further, the determination circuit 24 defines a signal having such a voltage level that the compressor 10 is not rotated, as a second electric signal. Then, the determination circuit 24 collates the logical product of both the electric signals and outputs a failure signal to a relay circuit 26 and an informing circuit 28 when meeting the condition of the logical product.

The determination operation in the determination circuit 24 is interrupted by a delay circuit 30 connected to the determination circuit 24 until a certain period of time is elapsed after the exciting current is supplied to the electromagnetic clutch 14. As a result, it is possible to prevent a malfunction from occurring at the beginning of the operation of the compressor 10.

The relay circuit 26 includes a normally-closed contact 32. The normally-closed contact 32 is arranged on a feed line serving for the exciting current which is supplied from a battery 34 to the electromagnetic clutch 14 through a switch 36 and a control circuit 38.

The battery 34 is used as a power source for the electric potential adjusting circuits 18, 22, the determination circuit 24, the relay circuit 26, the informing circuit 28 and the delay circuit 30. Accordingly, these circuits receive the power of the battery 34 through an electric supply line 40. As a result, the electric potential adjusting circuits 18, 22, the determination circuit 24, the relay circuit 26, the informing circuit 28 and the delay circuit 30 are actuated only when the compressor 10 should be actuated.

When the switch 36 is opened, the compressor 10 is separated from the driving belt 12 by the electromagnetic clutch 14, and the electric potential adjusting circuits 18, 22, the determination circuit 24, the relay circuit 26, the informing circuit 28 and the delay circuit 30 are then not in operating state.

When the switch 36 is closed, the exciting current is applied to the electromagnetic clutch 14 so that the compressor 10 is connected with the driving belt 12, and is rotated. Simultaneously, the electric potential adjusting circuits 18, 22, the determination circuit 24, the relay circuit 26, the informing circuit 28 and the delay circuit 30 are in operating state.

When the engine and the compressor 10 are normally rotated, the second electric signal is not outputted from the second electric potential adjusting circuit 22 while the first electric signal is outputted from the first electric potential adjusting circuit 18. Therefore, no failure signal is outputted from the determination circuit 24.

On the other hand, in case where the compressor 10 stops although the engine is normally rotated when the electric potential adjusting circuits 18, 22, the determination circuit 24, the relay circuit 26, the informing circuit 28 and the delay circuit 30 are actuated, i.e., when the compressor 10 should be actuated, the first and second electric potential adjusting circuits 18 and 20 output the first and second electric signals, respectively. As a result, the determination circuit 24 output the failure signal.

Therefore, the normally-closed contact 32 of the relay circuit 26 is opened so that the exciting current is not applied to the electromagnetic circuit 26. As a result, the compressor 10 is separated from the driving belt 12. Further, the informing circuit 28 is actuated so as to inform on a failure of the compressor 10 by means of a buzzer, an indicating lamp or the like, for example.

The sound of the buzzer or the lightning of the indicating lamp informs a driver in the automobile of an abnormality of the compressor.

What is claimed is:

1. A power separating apparatus in an automobile for separating a rotated device rotated by an engine power transmitted through a driving belt and an electromagnetic clutch from said driving belt in case of a failure of said rotated device, comprising:

first detecting means for generating a first electric signal having a predetermined voltage level when an engine is actuated and said rotated device should be actuated;

second detecting means for generating a second electric signal having a predetermined voltage level when said rotated device is not actuated and said rotated device should be actuated;

determining means for generating a failure signal indicating a failure to said rotated device depending upon a condition of logical product of said first electric signal and said second electric signal when said rotated device should be actuated; and means for controlling said electromagnetic clutch to separate said rotated device from said driving belt on the basis of said failure signal.

2. A power separating apparatus according to claim 1, wherein each of said first and second detecting means includes a circuit for adjusting the voltage level of the signal to be supplied to said determining means and a detector that is standard with the automobile.

3. A power separating apparatus according to claim 2, further comprising control informing means for informing on failure of said rotated device.

4. A power separating apparatus according to claim 1, wherein said control means includes a circuit for shutting off exciting current applied to said electromagnetic clutch on the basis of said failure signal.

5. A power separating apparatus in an automobile for separating a rotated device from a driving belt by use of an electromagnetic clutch in case of a failure of the rotated device, the apparatus comprising:

a first detector being operable to generate a first electric signal when an engine is actuated;

a second detector being operable to generate a second electric signal when the rotated device is not actuated and should be actuated;

a determination circuit being operable to receive the first and second electrical signal and being operable to generate a failure signal indicating a failure of the rotated device depending upon a condition of a logical product of the first and second electrical signals when the rotated device should be actuated;

means for controlling the electromagnetic clutch to separate the rotated device from the driving belt on the basis of the failure signal.

6. The power separating apparatus of claim 5 wherein the first and second detector are standard with the automobile.

7. The power separating apparatus of claim 5 further including an electric potential adjusting circuit coupled between the first and second detectors and the determination circuit.

8. The power separating apparatus of claim 5 wherein the determination circuit is activated only when the electromagnetic clutch should engage the drive belt and the rotated device.

9. The power separating apparatus of claim 5 wherein the control means includes a circuit for shutting off exciting current applied to the electromagnetic clutch on the basis of the failure signal.

10. The power separating apparatus of claim 5 further including a delay circuit coupled to the determination circuit to delay the determination circuit for a period of time after exciting current is applied to the electromagnetic clutch.

11. In an automobile having a rotated device rotated by engine power transmitted through a driving belt and an electromagnetic clutch for separating the driving belt from the rotated device in case of a failure of the rotated device, wherein the automobile includes a standard detector mounted thereto, the standard detector providing to an indicator an engine-state signal indicating whether or not the engine is operating, an improved power separating apparatus, comprising;

a device detector connected to the rotated device and generating a device-state signal having a predetermined voltage level when the rotated device is not actuated whenever the rotated device should be actuated;

a determining circuit connected to receive the device-state signal, the determining circuit also being connected to the standard detector so that the engine-state signal is provided to both the indicator and to the determining circuit, the determining circuit generating a failure signal indicating a failure in the rotated device depending upon a condition of logical product of the engine-state signal and the device-state signal; and means for controlling the electromagnetic clutch to separate the rotated device from the driving belt in response to the failure signal.

* * * * *